Sept. 9, 1941.   C. WHITE ET AL   2,255,404
SLUSH PUMP VALVE
Filed Nov. 30, 1940
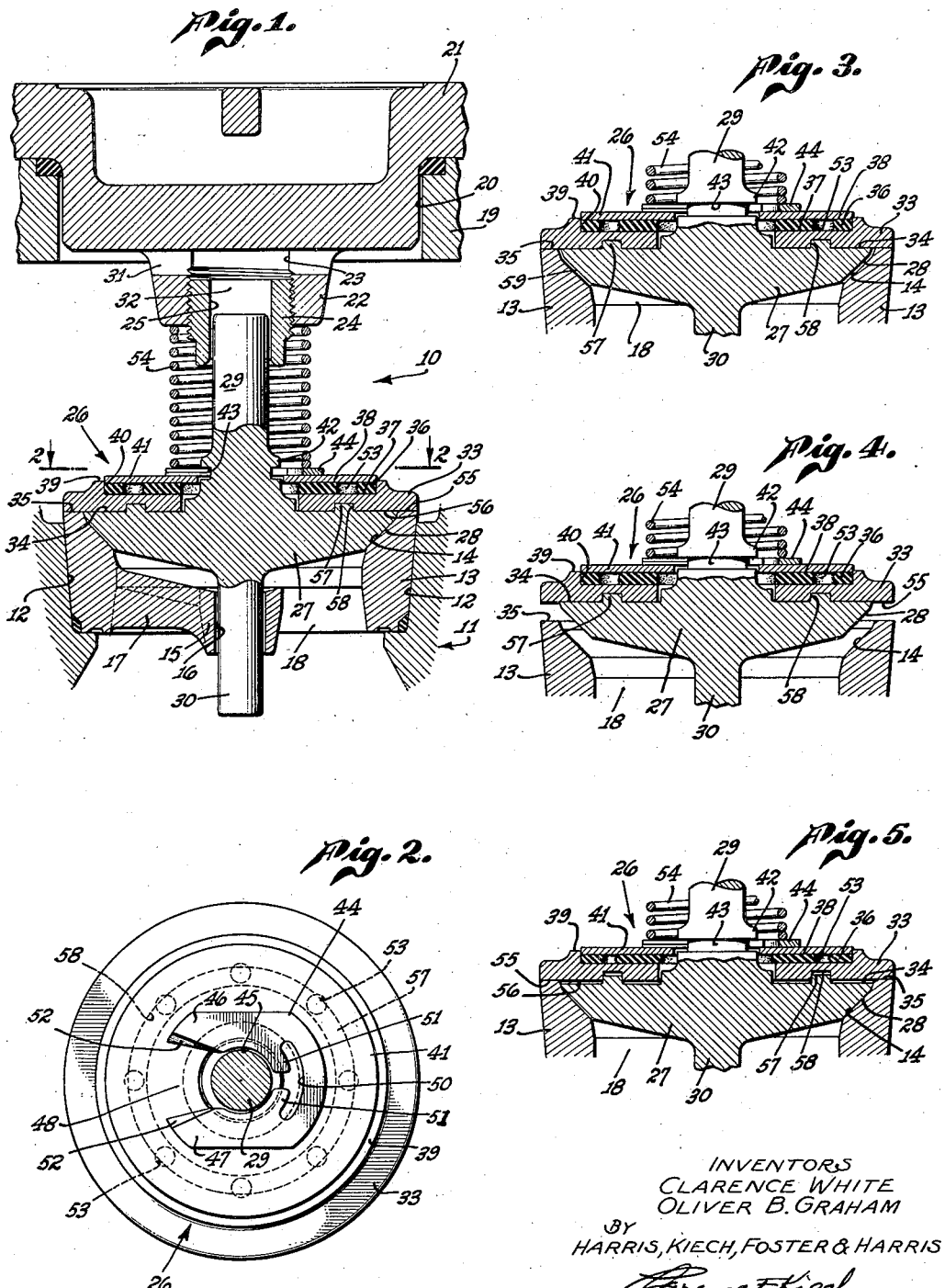
INVENTORS
CLARENCE WHITE
OLIVER B. GRAHAM
BY
HARRIS, KIECH, FOSTER & HARRIS
Clarence F. Kiech
FOR THE FIRM
ATTORNEYS Patented Sept. 9, 1941

2,255,404

UNITED STATES PATENT OFFICE 2,255,404

SLUSH PUMP VALVE

Clarence White, Walnut Park, and Oliver B. Graham, Los Angeles, Calif., assignors to Oil Well Manufacturing Corporation, Los Angeles, Calif., a corporation of California Application November 30, 1940, Serial No. 368,076

8 Claims. (Cl. 251—144)

This invention relates to check valves, and more particularly to a novel form of check valve suitable for use in a slush-pump valve structure.

In drilling oil wells by the rotary method, it is customary to continuously supply rotary mud under pressure to the rotating bit through the drill pipe. A slush pump is utilized for developing this high pressure. The intake and outlet valves of the slush pump are of the check valve type and ordinarily comprise a stationary seat and a pressure-operated valve member adapted to seat thereon to form a fluid tight fit when the pressure on one side of the valve becomes greater than on the other side thereof by a predetermined amount.

The mud used in ordinary drilling operations contains large quantities of abrasive matter, which quickly wears away the valve and the valve seat.

A flexible rubber valve, because of its ability to conform to a rough metal seat would be the most satisfactory form of valve for slush pumps if it were not for the high pressure to which such a valve is subjected. An all-metal valve, while capable of sustaining these high pressures, wears rapidly under the abrasive action of the pumping fluids.

Valves combining metal and rubber parts to secure both the flexibility and resistance to high pressure have been devised for use in slush pumps. Such a valve is shown in Patent No. 2,103,503 issued December 28, 1937, to one of the instant inventors. The invention herein described is an improvement upon the valve described in the specification and shown in the drawing of that patent.

It is one object of this invention to provide means for facilitating the application of the fastening clip of the valve shown in Patent No. 2,103,503.

It is another object of this invention to provide means for lightening the impact of the sealing disc of that valve on the valve seat to the end that the useful life of the sealing disc may be prolonged, and roughening and destruction of its sealing face inhibited.

Also to prolong the useful life of the sealing disc, and to prevent its fracture and preserve unimpaired its sealing face, it is an object of this invention to provide means for preventing an increase of the force of the impact of the sealing disc on the valve seat as the valve body and valve seat wear away at their engaging faces increasing the travel of the valve body.

It is another object of this invention to provide that the effective character of the sealing action of the sealing disc shall be maintained and even increased as the valve body and valve seat wear away in use. It is also an object to lessen the force of the impact of the valve body against the valve seat as the valve body and valve seat become worn.

These and other objects of this invention will be understood from the following description and claims read in connection with the accompanying drawing which presents a particular embodiment of the invention for illustrative purposes only.

This application is a continuation-in-part of our application Serial No. 349,140, filed August 1, 1940, upon which Patent No. 2,223,651, issued on December 3, 1940.

In the drawing:

Fig. 1 is a sectional view of a check valve of our invention showing the valve in closed position;

Fig. 2 is a sectional view taken as indicated by the line 2—2 of Fig. 1;

Fig. 3 is a fragmentary sectional view similar to Fig. 1, showing a valve structure in which the valve body and valve seat have become worn from use and with the valve in closed position;

Fig. 4 is a sectional view similar to Fig. 3, showing the valve in its extreme open position; and Fig. 5 is a sectional view similar to Figure 3, showing the valve in closed position at the moment of impact of the valve body on the valve seat at the end of the closing movement of the valve.

A valve structure 10 is shown in Fig. 1 comprising a metal valve seat 13 and a valve 26. A valve deck 11 is provided with an upwardly diverging tapered passage 12 adapted to receive preferably in press fit relationship the valve seat 13 of the valve structure 10. The valve seat 13 is provided with an inner upwardly facing conical seating surface 14 and with a central hub 15 providing an axial bore 16. The hub 15 is integrally connected to the body portion of the seat 13 by a web 17 substantially in the manner shown, so as to provide a fluid passage 18 through the seat.

Provided in a valve housing 19, directly above the valve structure 10, is an opening 20 of sufficient diameter to allow the passage of the valve structure therethrough. The opening 20 is closed by a suitable cap 21 having a centrally disposed depending cylindrical boss 22 formed with a central cylindrical recess 23, which is interiorly threaded to receive a threaded bushing 24. This bushing has a central bore 25 defining a bore chamber 32 which extends coaxially with the bore 16 in the hub 15. The valve 26 has a disc shaped metal body 27 formed on its peripheral edge with a downwardly facing conical face 28 conforming to the shape of the seating surface 14 of the seat 13. This body is designed to carry the pressure load on the valve. The valve body 27 has a preferably integral stem 29 which projects axially above the central portion of the valve body 27. The valve body 27 also has a preferably integral pin 30 which projects axially below the central portion of the valve body. These projections are of such diameters as to be slidably received in the bores 25 and 16 respectively for the purpose of guiding the valve body 27 in its vertical reciprocatory movements out of contact and into contact with the valve seat 13. The boss 22 is formed with a plurality of radially disposed passages 31 therethrough adjacent the body of the cap 21 to permit free movement of mud fluid into and out of the bore chamber 32 of the bushing 24 and thereby provide for a free sliding movement of the stem 29 within the bore 25.

Carried by the body 27 and forming a part of the valve 26 is a centrally apertured annular disc 33 formed of hard rubber or other suitable material having a very limited compressibility and flexibility and of sufficient hardness to resist abrasion. The disc 33 is preferably in the form of an annular ring which surrounds the stem 29 and rests upon an upper surface 34 of the valve body 27. This disc is of larger diameter than the body 27 so as to extend outwardly beyond the periphery thereof and preferably as far as the outer edge of an upper annular horizontal seating face 35 of the valve seat 13, upon which it also rests because the surfaces 34 and 35 are in substantially the same plane when the valve structure is new.

A rubber ring or annulus 36 is inlaid either loosely or adhesively in a circular recess 37 formed in the upper horizontal face 39 of the insert disc 33. This rubber ring 36 is of softer material than the insert disc 33 and is preferably of a diameter substantially smaller than the overall diameter of the valve body 27. Its upper surface 38 is preferably approximately flush with the upper horizontal face 39 of the insert disc and its diameter is such that it snugly fits within the circular shoulder 40 of the recess 37.

Disposed on top of the rubber ring 36 is a centrally-apertured pressure plate 41, of a diameter preferably the same as that of the rubber ring 36 or at most, of no greater diameter. The pressure plate 41 is thus capable of being moved downwardly within the circular shoulder 40 to compress the rubber ring 36. If, in a less preferable structural arrangement, the rubber ring 36 is of substantially greater thickness than the depth of the recess 37, the pressure plate 41 may be made of a larger diameter than the rubber ring and yet be capable of being moved downwardly to compress the ring in a manner and for a purpose to be presently described.

Formed in the stem 29 adjacent the pressure plate 41 is a shoulder 42 which forms the upper horizontal face of an annular groove 43 formed in the stem 29. The shoulder 42 serves as an abutment for a resilient clip 44 adapted to retain in assembled relationship the pressure plate 41, ring 36, disc 33 and valve body 27.

The clip 44 is in the form of a plate having a central opening 45 sized to closely fit within the annular groove 43 in the stem 29. The clip is provided with a pair of fingers 46 and 47 cooperating to form a passage 48 extending through one side of the plate to the central opening 45. As illustrated in Fig. 2, the width of the constricted portion of this passage is slightly less than the diameter of the central opening 45. The outer portions of the fingers 46 and 47 are preferably tapered outwardly and beveled upwardly. Formed in the clip 44 on the opposite side from the passage 48 is a cut out portion 50 communicating with the opening 45 in such a manner that the walls formed by the opening 45 provide a pair of arcuate segments 51 spaced as shown from the integral resilient portion adjoining the fingers 46 and 47.

With the disc 33 and the pressure plate 41 assembled on the valve body 27 as shown and previously described, the clip 44 is positioned on the pressure plate 41 so that the tapered surfaces 52 of the fingers 46 and 47 engage the lower surface of the shoulder 42. The clip 44 is then driven or otherwise forced laterally so that the fingers 46 and 47 snap around the stem 29 into the position shown in Fig. 4, which serves to confine the rubber ring 36 and the disc 33 between the clip 44 and the body 27. It is obvious that for the removal of the disc 33 from the valve body, it is only necessary to force the clip 44 in the opposite direction to that above described whereupon the pressure plate 41 and the disc 33 may be removed from the valve body for replacement.

The insert disc 33 is made preferably, but not necessarily, of non-metallic material of slightly compressible character which is, however, sufficiently hard to resist the blows to which it is subjected and the abrasive action of the mud fluid. It is preferably made of hard rubber, although it may be made of Bakelite or other non-metallic and plastic material.

While the disc 33 is made of a hard rubber which is more compressible than metal, so as to provide an effective sealing contact with the annular surface 35 of the valve seat, it would be difficult to insert the clip 44 into position between the plate 41 and the shoulder on the valve stem, if the ring or annulus 36 of soft rubber were omitted from the valve assembly and the plate 41 directly engaged the disc 33.

The soft rubber ring 36 is formed with an annular row of apertures 53 so that the rubber material of the ring may spread laterally when the ring is acted upon by a compressive force, permitting the ring to contract along axial lines without, at the same time, suffering a destructive deformation.

Confined between the retaining clip 44 and the lower end of the boss 22 is a compression spring 54 adapted to constantly urge the valve 26 downward into engagement with the seat 13 against the pressure differential of the mud fluid in the fluid chambers on the two sides of the valve structure.

In the operation of the valve, the valve body 27 carries the pressure load of the mud fluid above the valve and transmits it through the seating surfaces 28 and 14 to the valve seat 13, and a radially outermost annular portion 55 of the lower surface 56 of the insert disc 33 engages the annular face 35 of the seat 13 forming an annular seal by reason of the relatively compressible character of the insert disc 33.

The spring 54 is not sufficiently strong to compress the soft rubber ring 36, with the result that at all times during the cycle of movement of the valve, the clip 44 is held tightly against the shoulder 42 above it. Upon the upper face 34 of the valve body 27 is formed a vertically-sided annular rib or tongue 57 which fits snugly but slidably within a vertically-sided annular groove 58 formed in the undersurface 56 of the insert disc 33.

Fig. 1 shows the relative position of the several parts of the valve structure when the valve body and valve seat are new and no wear has taken place at the surfaces 14 and 28. When the valve descends under the action of the spring 54 and the back-pressure of the mud fluid, and the valve body and sealing disc are simultaneously stopped in their downward travel the impact of the sealing disc at the surface 55 upon the annular surface 35 of the valve seat 13 is softened by the cushioning action of the rubber ring 36. This is desirable because repeated heavy impacts of the insert disc 33 upon the valve seat 13 would cause a roughening of the surface 55 and a breakdown of the molecular structure of the disc, interfering with its effectiveness as a sealing agent, and causing it eventually to chip and break.

Figs. 3, 4, and 5 illustrate what happens after the valve body and seat have been in use for some time and the surfaces 14 and 28 have become worn. Fig. 3 shows such a worn valve structure in the closed position. A clearance space 59 has developed between the surfaces 14 and 28, permitting a longer movement downward of the valve body with respect to the valve seat. The valve body is held upwardly away from the valve seat because the vertical distance between the shoulder 42 and the surface 56 is somewhat less than the combined thicknesses of the clip 44, pressure plate 41, rubber ring 36, and insert disc 33, with the result that, when the parts are assembled, the rubber ring 36 is under sufficient compression to hold the valve body tightly against the underface of the insert disc, against the action both of gravity and of the spring 54. Since the wear between the undersurface 55 of the insert disc and the upper surface 35 of the valve seat is less rapid than that between surfaces 14 and 28, due to the cushioning action of the rubber ring 36, it is apparent that the clearance space 59 will develop because of this differential rate of wear.

Fig. 4 shows the worn valve structure in open position. Here, also, the clip 44 is held tightly against the shoulder 42. Fig. 5 shows the worn valve structure at the moment that the surface 28 of the valve body strikes the surface 14 of the valve seat. Prior to that moment, the surface 55 of the under section of the insert disc 33 has contacted the surface 35 of the valve seat, stopping further downward movement of the insert disc. Between that instant of contact and the moment of lowermost position of the valve body, the rubber ring 36 is compressed preventing a sudden development of full pressure between the surfaces 55 and 35 at the time these two surfaces first contact. It then absorbs much of the kinetic energy of the falling valve structure, and delivers this energy to the valve seat by way of the surfaces 55 and 35 which, being in contact, can transmit energy without destructive results. To just that extent is the blow of the valve body on the valve seat lightened in character, when the valve body later reaches the lowermost limit of its downward travel.

During this slight additional increment of downward travel of the worn valve, the vertically-sided rib 57 and the vertically-sided groove 58 form a seal to prevent the flow of fluid from the clearance space 59 between the insert disc and upper face of the valve body centrally inward toward the valve stem 29.

It will thus be seen that this invention provides means for facilitating the insertion of the fastening clip, for obviating a hammer blow between insert disc and valve seat in a new or old valve structure and for decreasing the hammer blow between the valve body and valve seat as the valve body and valve seat wear, consequently checking the rate of wear. At the same time the invention provides an effective seal as the valve structure wears.

Furthermore the reduction of the thickness of the hard rubber in the valve insert at annular zones other than the extreme outer annular portion of the valve insert and the replacement of this hard rubber with a softer more flexible rubber allow a downward flexure of the inner portion of the valve insert as the valve structure becomes worn, insuring a tight seal between the surfaces 35 and 55 and further absorbing the kinetic energy of the falling valve to still further relieve the hammer blow between the valve body and valve seat.

Although there have been herein described certain embodiments of this invention, it is understood that various changes may be made and the invention may be embodied in other structures without departing from the scope of the invention, which is defined in the appended claims.

While the insert disc 33 has been described herein as being preferably non-metallic or made of hard rubber, when the valve structure is to be used in pumps of other kinds than slush pumps, the disc may be made of any material suitable for the use for which the pump is designed. Thus this insert disc for use in oil pumps may be made of bronze, a material which is resistant to destructive action by oil. While as to some features of the invention the material of this insert disc is non-metallic, as to other features it may be made of metal or any other material suitable to the type of pump in which it is used.

We claim as our invention:

1. In a valve structure, the combination of: a valve seat having a first annular seating surface and a second annular seating surface concentrically beyond said first seating surface; a valve body formed with a surface to engage said first seating surface when said valve structure is in closed position and having a stem with an annular shoulder thereon; a non-metallic relatively compressible centrally apertured sealing disc loosely disposed about said stem and formed to have a surface disposed for sealing contact with a surface on said valve body and a surface disposed for simultaneous sealing contact with said second seating surface when said valve structure is in closed position; and a means for retaining said sealing disc in permanent sealing contact with said valve body, said retaining means being disposed between said shoulder and sealing disc and comprising a plurality of superimposed discs including a resilient disc of greater compressibility than said sealing disc.

2. In a valve structure, the combination of: a valve seat having a first annular seating surface and a second annular seating surface concentrically beyond said first seating surface; a valve body formed with a surface to engage said first seating surface when said valve structure is in closed position and having a stem with an annular shoulder thereon; a non-metallic relatively compressible centrally apertured sealing disc loosely disposed about said stem and formed to have a surface disposed for sealing contact with a surface on said valve body and a surface disposed for simultaneous sealing contact with said second seating surface when said valve structure is in closed position; and a means for retaining said sealing disc in permanent sealing contact with said valve body, said retaining means being disposed between said shoulder and sealing disc and comprising a resilient disc of greater compressibility than said sealing disc, and contactually engaging said sealing disc and further comprising a removable wedge means disposed between said shoulder and said resilient disc.

3. In a valve structure, the combination of: a metallic valve seat having a first annular seating surface and a second annular seating surface concentrically beyond said first seating surface; a valve body formed with a surface to engage said first seating surface when said valve structure is in closed position and having a stem with an annular shoulder thereon; a non-metallic relatively compressible centrally apertured sealing disc loosely disposed about said stem and formed to have on one of its sides a surface disposed for sealing contact with a surface on said valve body and on the same side a surface disposed for simultaneous sealing contact with said second seating surface when said valve structure is in closed position and provided on its other side with an annular recess; a resilient centrally apertured disc of greater compressibility than said sealing disc, said resilient disc being seated in and snugly fitting within said recess; a pressure plate disposed upon said resilient disc; and a wedge-like fastening means between said shoulder and pressure plate adapted when in fastening position to compress said resilient disc in said recess.

4. In a valve structure, the combination of: a valve seat having a first annular seating surface and a second annular seating surface concentrically beyond said first seating surface; a valve body formed with a surface to engage said first seating surface when said valve structure is in closed position and having a stem with an annular shoulder thereon; a non-metallic relatively compressible centrally apertured sealing disc loosely disposed about said stem and formed to have a surface disposed for sealing contact with a surface on said valve body and a surface disposed for simultaneous sealing contact with said second seating surface when said valve structure is in closed position; and a means for retaining said sealing disc in permanent sealing contact with said valve body, said retaining means being disposed between said shoulder and sealing disc and comprising a resilient disc formed with a plurality of apertures and being of greater compressibility than said sealing disc and contactually engaging said sealing disc, and further comprising a removable wedge means disposed between said shoulder and said resilient disc.

5. In a valve structure, the combination of: a valve seat having a first annular seating surface and a second annular seating surface concentrically beyond said first seating surface; a valve body formed with a surface to engage said first seating surface when said valve structure is in closed position and having a stem with an annular shoulder thereon; a non-metallic relatively compressible centrally apertured sealing disc loosely disposed about said stem and formed to have a surface disposed for sealing contact with a surface on said valve body and a surface disposed for simultaneous sealing contact with said second seating surface when said valve structure is in closed position, said sealing disc and valve body being provided on their engaging faces with annular sealing elements of a tongue-and-groove character adapted for slidable engagement along axial lines; and a means for retaining said sealing disc in permanent sealing contact with said valve body, said retaining means being disposed between said shoulder and sealing disc and comprising a plurality of superimposed discs including a resilient disc of greater compressibility than said sealing disc.

6. In a valve structure, the combination of: a metallic valve seat having a first annular seating surface and a second annular seating surface concentrically beyond said first seating surface; a valve body formed with a surface to engage said first seating surface when said valve structure is in closed position and having a stem with an annular shoulder thereon; a non-metallic, relatively compressible, centrally apertured sealing disc loosely disposed about said stem and formed to have on one of its sides a surface disposed for sealing contact with a surface on said valve body and on the same side a surface disposed for simultaneous sealing contact with said second seating surface when said valve structure is in closed position; a resilient, centrally apertured disc of greater compressibility than said sealing disc, said resilient disc being seated against the other side of said resilient disc; a pressure plate disposed upon said resilient disc; a spring stationarily anchored at one end and disposed to apply pressure to said sealing disc; and a wedge-like fastening means between said shoulder and pressure plate adapted when in fastening position to compress said resilient disc against said sealing disc sufficiently to set up in said resilient disc an expansive force greater than the combined weight of said valve body and the expansive force of said spring when said valve structure is in closed position.

7. In a valve structure, the combination of: a valve seat having an outer annular seating surface perpendicular to the axis of the valve structure, and an inner seating surface concentric with and axially inset from said outer surface; a valve having a stem and a body adapted to seat against said inner seating surface when said valve structure is in closed position, said body having an annular face perpendicular to the axis of the valve structure and concentrically within said outer annular seating surface; a non-metallic sealing structure mounted concentrically on said stem in permanent sealing contact with said annular face of said valve body, comprising a first annulus of relatively wear-resisting, incompressible material of a diameter and shape to contact on one of its sides said outer annular seating surface when said valve structure is in closed position, and further comprising a second annulus of relatively elastically compressible material of lesser diameter than the inner diameter of said outer annular seating surface of said valve seat and concentrically mounted on the other side of said first annulus and about said stem; and a wedge means engaging the valve stem and second annulus and adapted to pressurally secure said sealing structure in said permanent sealing contact against said annular face of said valve body.

8. In a valve structure, the combination of: a valve seat having an outer annular seating surface perpendicular to the axis of the valve structure, and an inner seating surface concentric with and axially inset from said outer surface; a valve having a stem and a body adapted to seat against said inner seating surface when said valve structure is in closed position, said body having an annular face perpendicular to the axis of the valve structure and concentrically within said outer annular seating surface; a non-metallic sealing structure mounted concentrically on said stem in permanent sealing contact with said annular face of said valve body, comprising a first annulus of relatively wear-resisting, incompressible material of a diameter and shape to contact said outer annular seating surface when said valve structure is in closed position, and further comprising a second annulus of relatively elastically compressible material of lesser diameter than the inner diameter of said outer annular seating surface of said valve seat and concentrically laminated with said first annulus; means on said valve stem for clamping said sealing structure against said annular face of said valve body; and a spring arranged to apply pressure at its one end on said sealing structure and adapted to bear at its other end upon a stationary member.

CLARENCE WHITE.
OLIVER B. GRAHAM.